United States Patent
Luo et al.

(10) Patent No.: US 11,627,518 B2
(45) Date of Patent: Apr. 11, 2023

(54) DISTRIBUTED PCI MANAGEMENT FOR MOBILE IAB NETWORK

(71) Applicant: QUALCOMM Incorporated, San Diego, CA (US)

(72) Inventors: Jianghong Luo, Skillman, NJ (US); Junyi Li, Chester, NJ (US); Karl Georg Hampel, Hoboken, NJ (US); Navid Abedini, Somerset, NJ (US); Luca Blessent, Whitehouse Station, NJ (US); Tao Luo, San Diego, CA (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/995,064

(22) Filed: Aug. 17, 2020

(65) Prior Publication Data
US 2021/0058854 A1  Feb. 25, 2021

Related U.S. Application Data

(60) Provisional application No. 62/889,484, filed on Aug. 20, 2019.

(51) Int. Cl.
*H04W 48/16* (2009.01)
*H04W 16/26* (2009.01)
*H04W 88/08* (2009.01)

(52) U.S. Cl.
CPC .......... *H04W 48/16* (2013.01); *H04W 16/26* (2013.01); *H04W 88/08* (2013.01)

(58) Field of Classification Search
CPC ..... H04W 48/16; H04W 16/26; H04W 88/08; H04W 16/10; H04W 84/005; H04W 24/02; H04W 8/26; H04W 84/04; H04W 92/20

(Continued)

(56) References Cited

U.S. PATENT DOCUMENTS

2014/0086138 A1* 3/2014 Teyeb ................ H04W 8/26
370/315
2015/0065112 A1  3/2015 Lee et al.
(Continued)

OTHER PUBLICATIONS

"3rd Generation Partnership Project; Technical Specification Group Radio Access Network; Study on RAN-centric data collection and utilization for LTE and NR (Release 16)," 3GPP Standard; Technical Report; 3GPP TR 37.816, 3rd Generation Partnership Project (3GPP), Mobile Competence Centre, 650, Route Des Lucioles, F-06921, Sophia-Antipolis Cedex, France, No. V16.0.0, Jul. 23, 2019, pp. 1-35. XP051754713, Retrieved from the Internet: URL: http://ftp.3gpp.org/Specs/latest/Rel-16/37_series/37816-g00.zip 37816-g00.doc [retrieved on Jul. 23, 2019] paragraph 5.2.2.

(Continued)

*Primary Examiner* — Tanmay K Shah
(74) *Attorney, Agent, or Firm* — Procopio, Cory, Hargreaves & Savitch

(57) ABSTRACT

When moving within an area covered by an Integrated access and backhaul (IAB) network, a mobile IAB node may come into proximity with another stationary or mobile IAB node that may have a same physical cell identifier (PCI) as the mobile IAB node. PCI collision issue may occur. Aspects presented herein address the possible PCI collisions. In an aspect of the disclosure, a method, a computer-readable medium, and an apparatus are provided. The apparatus may be an IAB node configured to determine a configuration associated with PCI management of a PCI of the IAB node. The apparatus may be further configured to change the PCI of the IAB node based on the determined configuration.

29 Claims, 10 Drawing Sheets

(58) Field of Classification Search
USPC .......................................................... 455/446
See application file for complete search history.

(56) References Cited

U.S. PATENT DOCUMENTS

| | | | |
|---|---|---|---|
| 2015/0215851 A1 | 7/2015 | Sivavakeesar | |
| 2017/0006447 A1* | 1/2017 | Bahta | H04W 4/90 |
| 2018/0062781 A1* | 3/2018 | Ly | H04L 1/0041 |
| 2018/0270671 A1 | 9/2018 | Agnihotri et al. | |
| 2020/0145967 A1* | 5/2020 | Park | H04W 72/0426 |
| 2020/0252847 A1* | 8/2020 | Park | H04W 88/14 |
| 2020/0351749 A1* | 11/2020 | Tesanovic | H04W 28/0268 |
| 2021/0051547 A1* | 2/2021 | Koskinen | H04W 36/08 |
| 2021/0051579 A1* | 2/2021 | Luo | H04W 76/11 |
| 2021/0168743 A1* | 6/2021 | Sheng | H04W 56/00 |

OTHER PUBLICATIONS

Ericsson: "Discussion and Solution for Distributed PCI Selection". 3GPP Draft, 3GPP TSG-RAN3 Meeting #105, R3-194296 Distributed PCI Selection, 3rd Generation Partnership Project (3GPP), Mobile Competence Centre, 650, Route Des Lucioles, F-06921, Sophia-Antipolis Cedex, France, vol. RAN WG3, No. Ljubljana, Slovenia, Aug. 26, 2019-Aug. 30, 2019, Aug. 17, 2019 (Aug. 17, 2019), XP051770488, 3 pages, Retrieved from the Internet: URL: http://www.3gpp.org/ftp/tsg_ran/WG3_lu/TSGR3_105/Docs/R3-194296.zip [retrieved on Aug. 17, 2019] paragraph 2.
International Search Report and Written Opinion—PCT/US2020/046781—ISA/EPO—dated Nov. 25, 2020.

* cited by examiner

DISTRIBUTED PCI MANAGEMENT FOR MOBILE IAB NETWORK

CROSS REFERENCE TO RELATED APPLICATION(S)

This application claims the benefit of U.S. Provisional Application Ser. No. 62/889,484, entitled "Distributed PCI Management for Mobile IAB Network" and filed on Aug. 20, 2019, which is expressly incorporated by reference herein in its entirety.

BACKGROUND

Technical Field

The present disclosure relates generally to communication systems, and more particularly, to integrated access and backhaul (IAB) networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An IAB network may include multiple cells in communication with each other to provide an access network and a backhaul network to a core network. The IAB network may include a mobile IAB node that may move to different geographic locations within an area covered by the IAB network. Each IAB node may have a Physical Cell Identifier (PCI). The PCI may be reused by multiple geographic separated cells in the network. When moving within the area covered by the IAB network, the mobile IAB node may come into proximity with another stationary or mobile IAB node that may have the same PCI as the mobile IAB node. A PCI collision may occur. Aspects presented herein address possible PCI collisions.

In an aspect of the disclosure, a method, a computer-readable medium, and an apparatus are provided. The apparatus may be an IAB node configured to determine a configuration associated with PCI management of a PCI of the IAB node. The apparatus may be further configured to change the PCI of the IAB node based on the determined configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
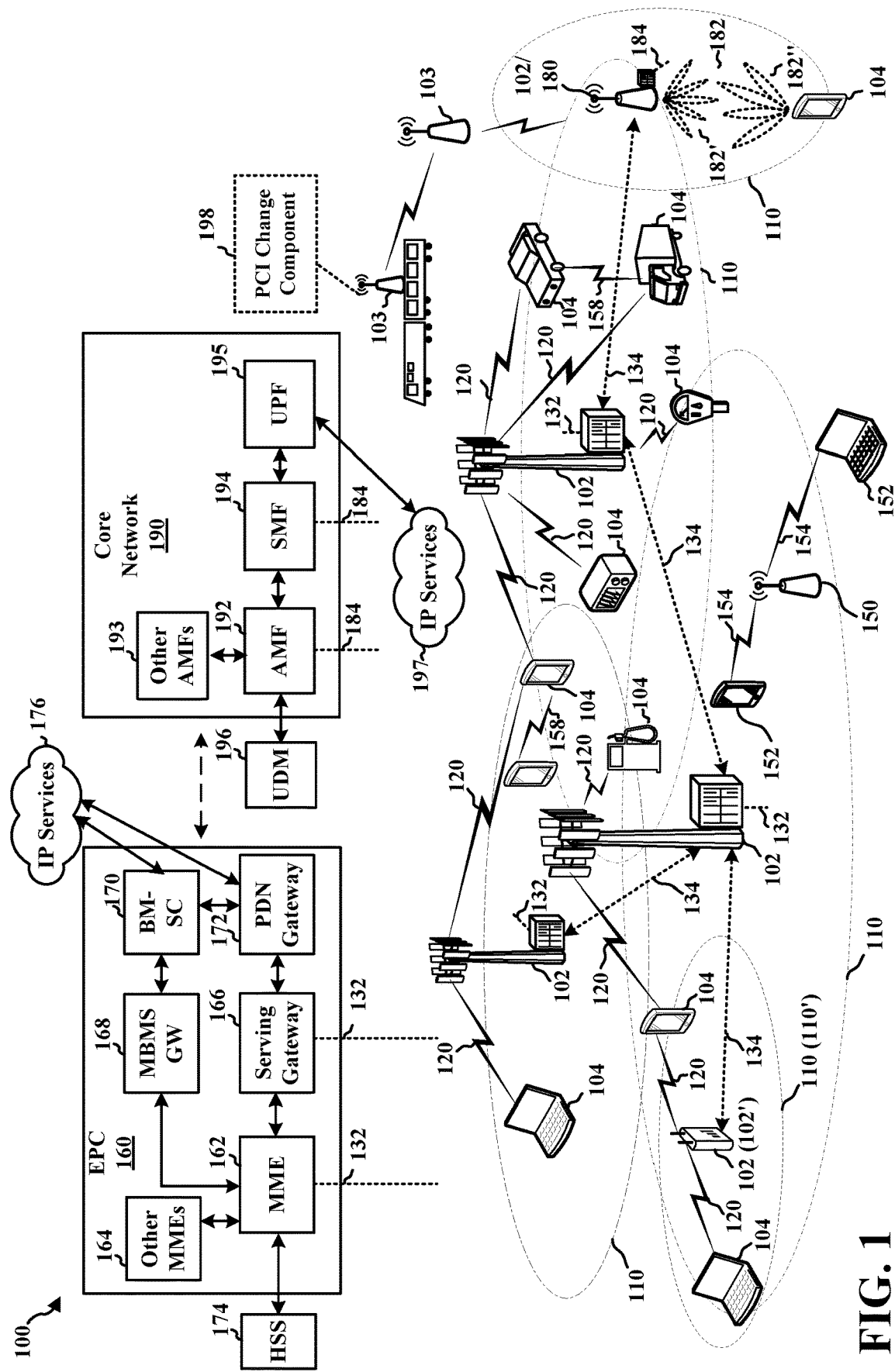
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, an IAB node 103 may be configured to determine a configuration associated with PCI management of a PCI of the IAB node. The IAB node 103 may comprise a PCI change component 198 configured to change the PCI of the IAB node based on the determined configuration. Although the following description may be focused on 5G NR, the concepts described herein may be applicable to other similar areas, such as LTE, LTE-A, CDMA, GSM, and other wireless technologies.

Figure 2:
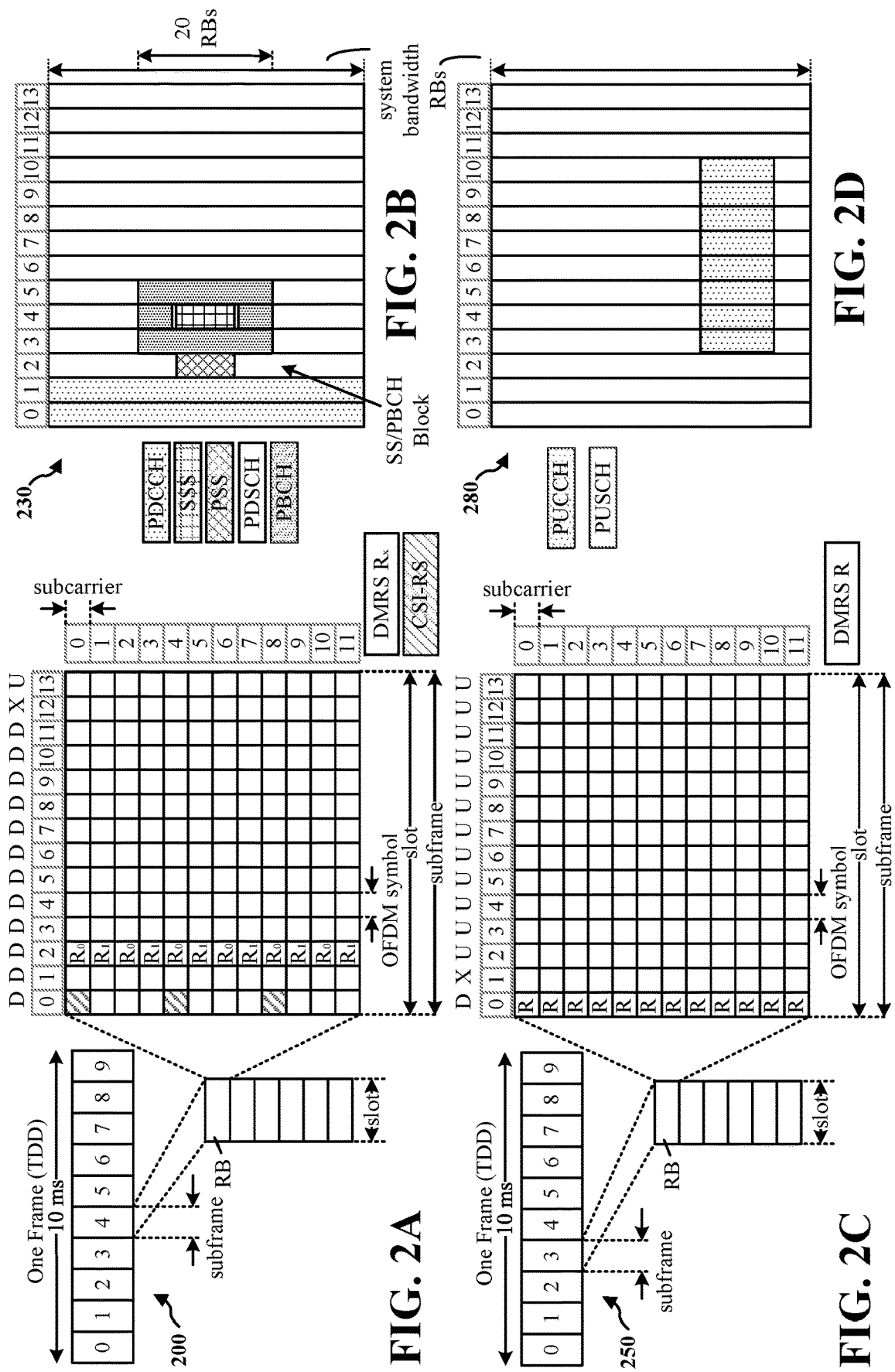
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have different frame structures and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology 0 there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a PCI. Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
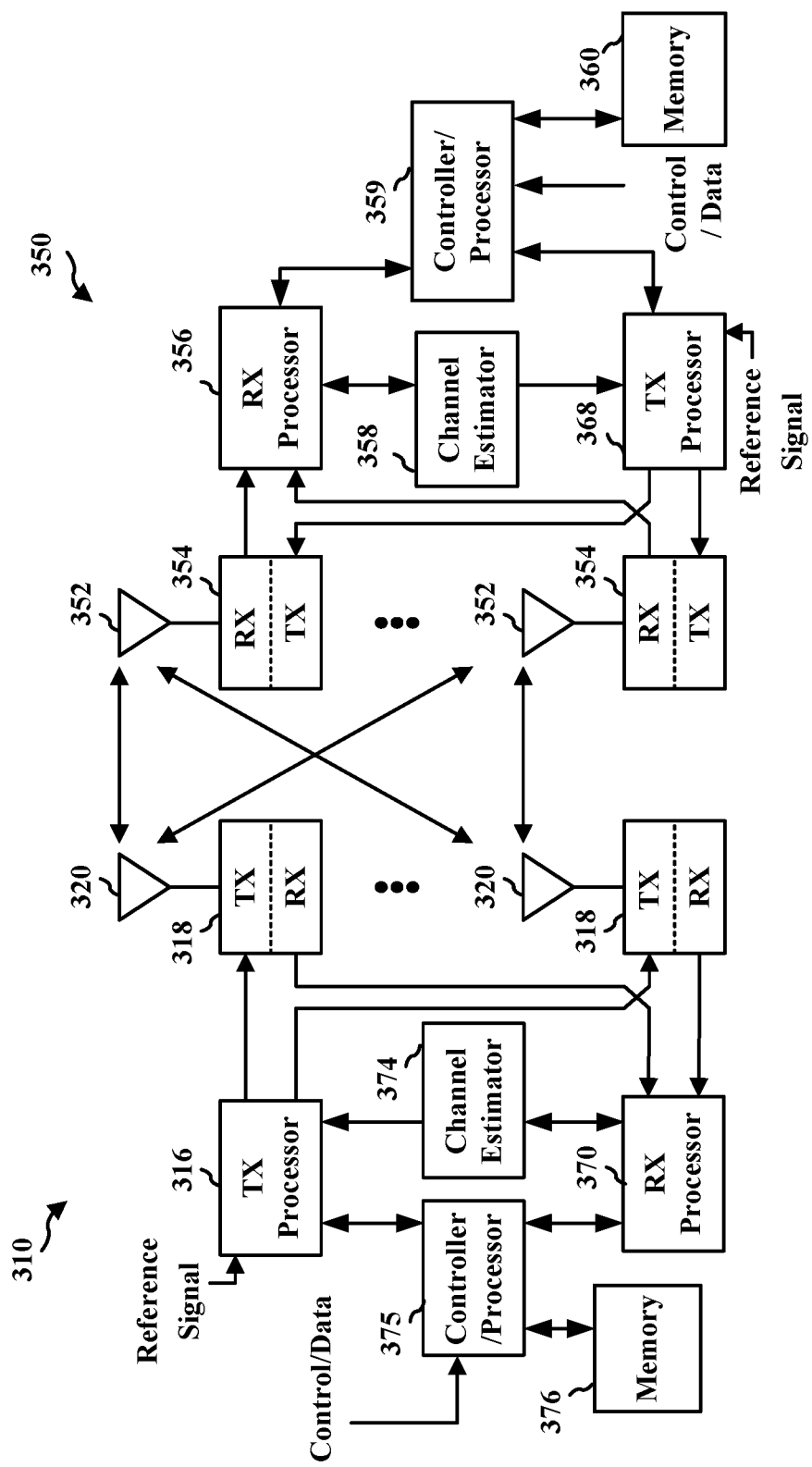
FIG. 3 is a diagram illustrating an example of a base station and user equipment (UE) in an access network.

FIG. 3 is a block diagram of an IAB node 310 in communication with a UE 350 in an access network. In the DL, IP packets from the EPC 160 or core network 190 may be provided to a controller/processor 375. The controller/processor 375 implements layer 3 and/or layer 2 functionality. Layer 3 includes a radio resource control (RRC) layer, and may be performed if the IAB node is a donor IAB node. Layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the IAB node 310. These soft decisions may be based on channel estimates computed by the channel estimator 358. The soft decisions are then decoded and deinterleaved to recover the data and control signals that were originally transmitted by the IAB node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the IAB node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the IAB node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the IAB node 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160 or core network 190, e.g., via a donor IAB node if the IAB node is not a donor IAB node. The controller/processor 375 is also responsible for error detection using an ACK and/or NACK protocol to support HARQ operations.

At least one of the TX processor 316, the RX processor 370, and the controller/processor 375 may be configured to perform aspects in connection with the PCI change component 198 of FIG. 1.

Figure 4:
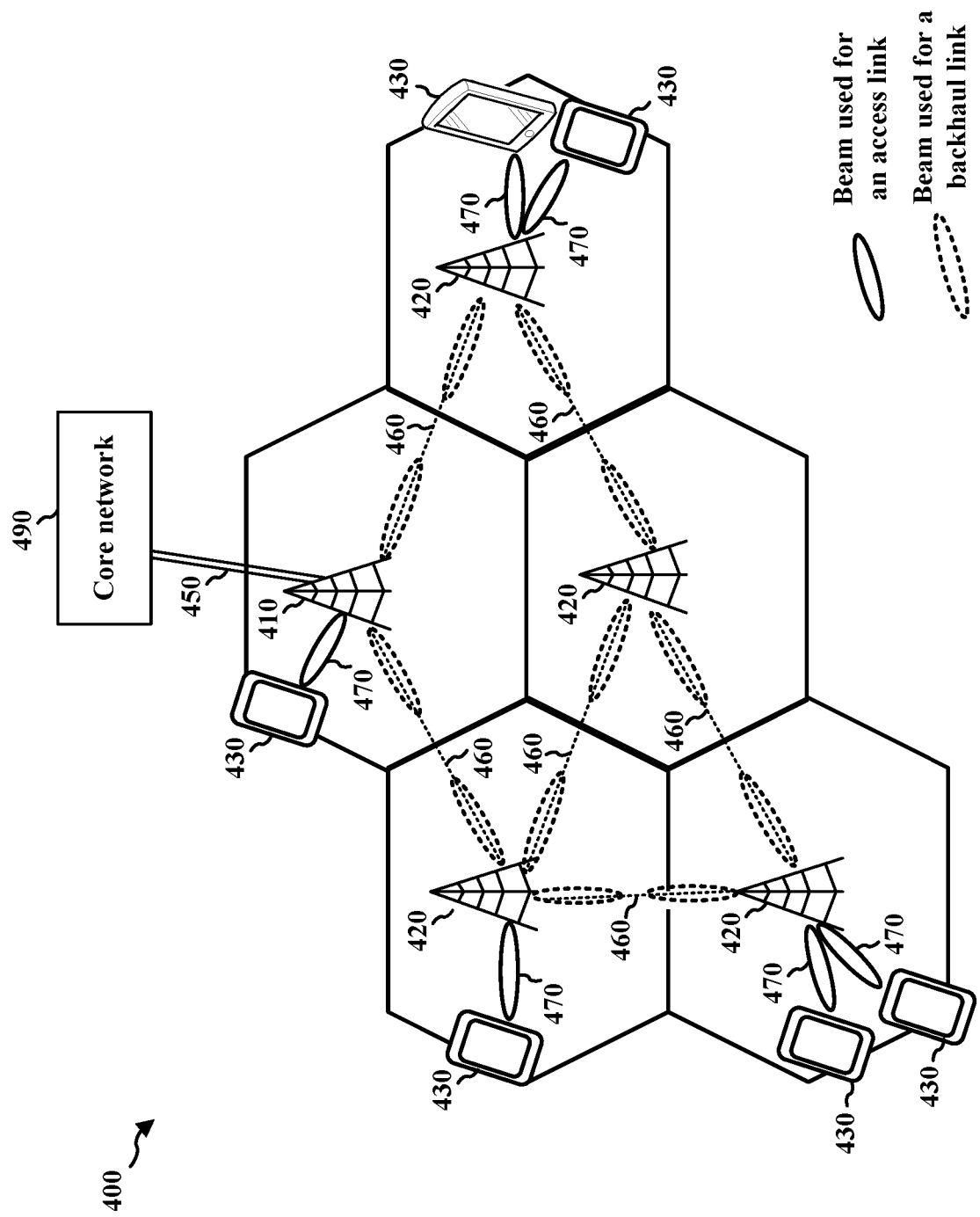
FIG. 4 is a diagram illustrating an IAB network.

FIG. 4 is a diagram illustrating an IAB network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, UEs, etc. Together, the IAB donor 410 and the IAB nodes 420 share resources to provide an access network and a backhaul network to core network 490. For example, resources may be shared between access links and backhaul links in the IAB network.

The UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For example, 5G NR systems may support 1008 PCI values. Accordingly, a given PCI value may be reused in the same network.

Figure 5:
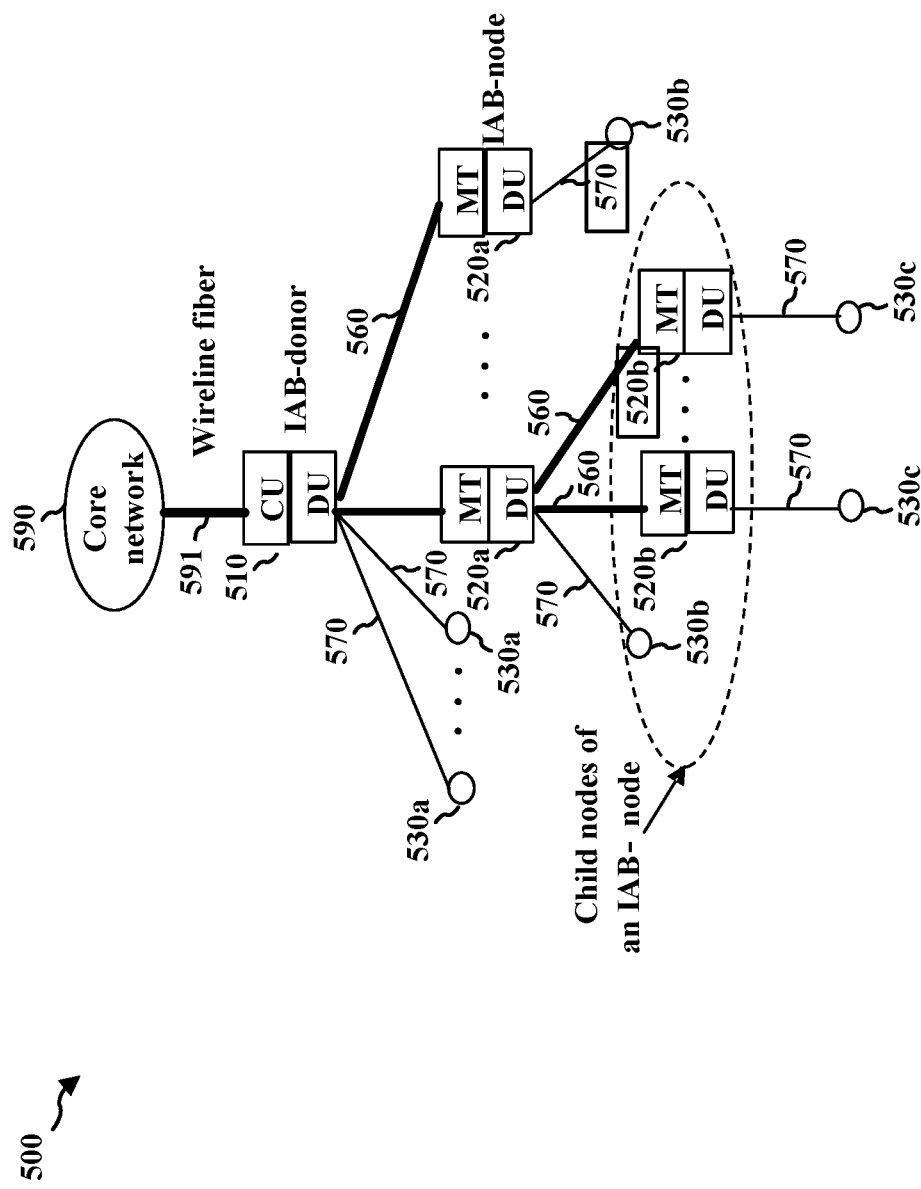
FIG. 5 is a diagram illustrating an IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530.

The IAB donor 510 may be considered a root node of the tree structure of the IAB network 500. The IAB donor 510 may be connected to the core network 590 via a wired connection 591. The wired connection may comprise, e.g., a wireline fiber. The IAB donor 510 may provide a connection to one or more IAB nodes 520a. The IAB nodes 520a may each be referred to as a child node of the IAB donor 510. The IAB donor 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB donor 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE by the DU of the parent node, e.g., IAB donor 510. The MT of IAB node 520b may operate as a scheduled node of parent node 520a. The DU of the IAB node 520a may schedule the child IAB nodes 520b and UEs 530b of the IAB node 520a.

Figure 6:
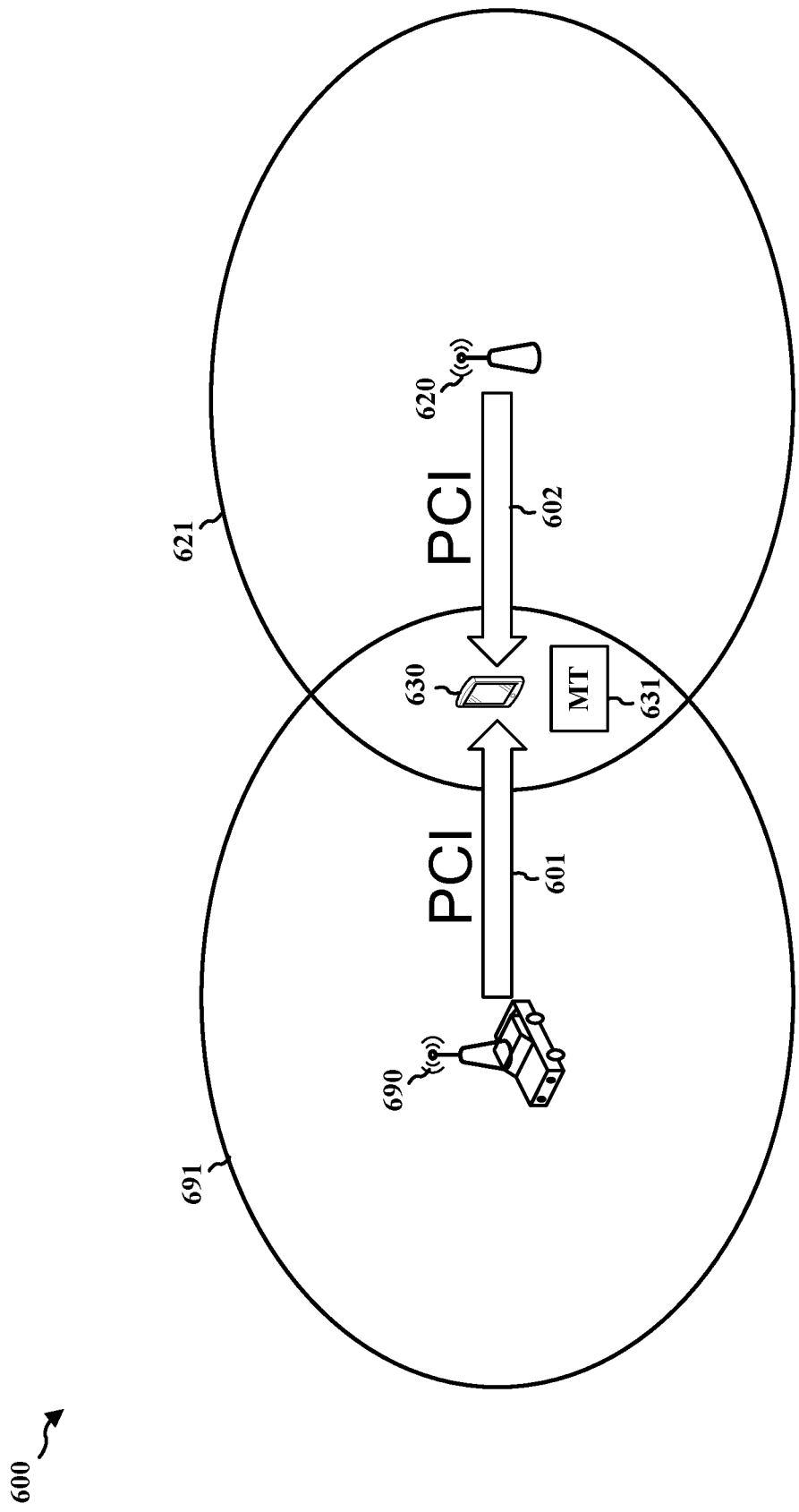
FIG. 6 illustrates nodes of an example IAB network including mobile IAB nodes.

FIG. 6 illustrates nodes of an example IAB network 600 including mobile IAB nodes. The IAB network 600 includes a mobile IAB node 690 and a second IAB node 620. The mobile IAB node 690 may move to different geographic locations within an area covered by the mobile IAB network 600. For example, the IAB node 690 may be installed on a bus, a taxi, a train, etc. In some aspects, the mobile IAB node 690 may correspond to a leaf node in the mobile IAB network 600, which is the last hop IAB node with only child access UEs connected to it. The mobile IAB node 690 may have no child IAB nodes. In other aspects, the mobile IAB node 690 may be allowed to have another IAB node as its child node.

Each IAB node of an IAB network (e.g., IAB donor 410, 510; IAB node 420, 520a, 520b, 620, 690) may have a PCI. The PCI may be an identifier for a cell. The IAB network may have a limited number of available PCI values. For example, the PCI may have 1008 distinct supported values for 5G NR system. Due to the limited number of PCI's, a PCI values may be reused by multiple geographic separated cells in a network. For example, cells with a same PCI may be distinguished by a unique Cell Global Identifier (NCGI) of a respective cell. The PCI may be carried by PSS/SSS in an SSB block transmitted by the IAB node. The PCI may be used to determine a scrambling sequence of physical signal/ channels transmitted by the IAB node. As an example, any of a Physical Broadcast Channel (PBCH), a PDCCH (e.g., PDCCH Core Set0), a cell-specific PDSCH transmission, etc. from the IAB node may be scrambled based on the PCI for the IAB node. For example, the PCI may be used as a scrambling seed for scrambling the channels. Other channels may be scrambled based on another scrambling seed.

When moving within the area covered by the mobile IAB network 600, the mobile IAB node 690 may come into proximity with the second IAB node 620 that may have the same PCI as the mobile IAB node 690. The second IAB node 620 may be a mobile IAB node or may be a stationary IAB node. As signals 601, 602 from the two IAB nodes may be scrambled based on the same PCI, a UE 630 receiving signals 601, 602 from both the mobile IAB node 690 and the second IAB node 620 may not be able to correctly identify the source of the signal, e.g., may be unable to differentiate between signal 601 from IAB node 690 and signal 602 from IAB node 620. For example, a UE may not be able to determine which cell (e.g., IAB node 690 or IAB node 620) a reference signal originated from. The use of a same PCI value by IAB nodes within proximity of each other may be referred to as a PCI collision. PCI collision may lead to issues with timing synchronization and channel estimation, and may further cause decoding failures for data traffic transmitted from at least one of these two neighboring cells. The PCI collision may similarly occur for an MT 631.

Figure 7:
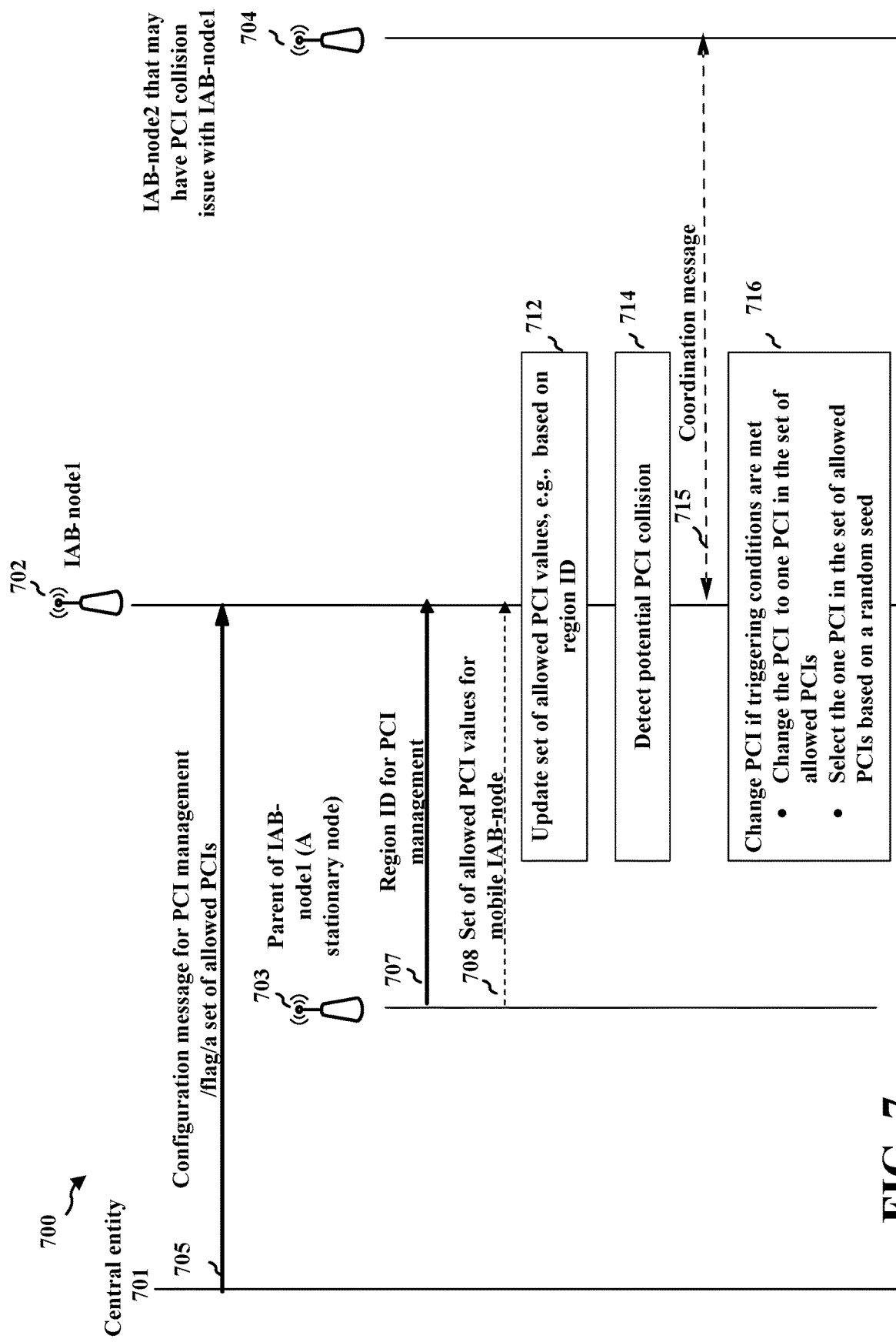
FIG. 7 illustrates example solutions to address PCI collision.

FIG. 7 illustrates an example communication flow 700 providing aspects to address PCI collision. In some aspects, distributed PCI management may be used in a mobile IAB network. A central entity 701 may send a configuration 705, e.g., via a configuration message, to an IAB node 702. The central entity 701 may send the configuration message to each of IAB nodes in the mobile IAB network. A PCI of the IAB node 702 may be autonomously updated by the IAB node 702 itself. The autonomous update may be controlled by the central entity 701 via one or more of the configuration parameters. The decision about whether to change the PCI of the IAB node 702 may be made by the IAB node 702 itself based on the configuration from the central entity 701. Thus, the central entity 701 may control autonomous update behavior of the IAB node 702 through one or more of the configuration parameters.

The configuration 705 may include a set of configuration parameters. One of the configuration parameters controlled by the central entity 701 may be a flag to enable/disable a PCI change. The network may allow the PCI change for a subset of IAB nodes, e.g., mobile IAB-nodes that are in the network may be allowed to autonomously update the PCI when a PCI collision occurs. For example, during configuration of different IAB nodes, a mobile IAB node may receive a flag to enable the PCI change, and a stationary IAB node may receive a flag to disable the PCI change. The flag may be indicated for each individual IAB-node, or for different types of IAB-nodes. As an example, a first type of nodes may be stationary IAB nodes, and a second type of nodes may be mobile IAB nodes. In such an example, the mobile IAB node may receive the flag from the central entity to enable the PCI change, and the stationary IAB-node may receive the flag from the central entity to disable the PCI change. While the term flag is used, the central entity may provide any type of indication to an IAB node to indicate whether or not autonomous PCI change is enabled for the IAB node.

In some aspects, the configuration may include a set of allowed PCI values for the IAB node to use for the PCI change. The network (e.g., the central entity 701, a parent of the IAB node 703, a stationary node 703, etc.) may configure the set of allowed PCI values that the IAB node 702 may use for the PCI change of the IAB node 702. In case if the set of allowed PCI values is not configured, for example, the whole PCI space may be used for the PCI change when the PCI change is enabled for the IAB node 702. The IAB node 702 may change the PCI of the IAB node 702 by setting the PCI of the IAB node 702 to one of the PCIS in the set of allowed PCIS, as illustrated at 716.

In some aspects, the configuration may include a random seed parameter, which the IAB node 702 may use to select a PCI within the set of allowed PCI values. If the random seed parameter is not configured, the IAB node 702 may determine the PCI value randomly when the PCI change is enabled for this IAB node 702. The IAB node 702 may select a PCI in the set of allowed PCIS based on the random seed, as illustrated at 716.

In some aspects, the configuration 705 may include triggering conditions for a PCI change. The IAB node 702 may change the PCI upon at least one of the triggering conditions being satisfied, as illustrated at 716.

The central entity 701 may be an entity in the core network (e.g. MME or another entity similar to MME), an IAB-donor, or another stationary IAB-node, or a gNB or eNB with larger coverage in the network.

In some aspects, the PCI space for the network may be managed based on location. For example, the whole network may be divided into a number of geographic regions, and each region may be associated with a subset of PCI values. A region may be a tracking area, a RAN area, or a system information area, or some other region partition that is specific for PCI management purposes. In some examples, the whole network may be regarded as one region, and all PCI values may be used for the whole network.

The PCI space for the region may be further managed using different options. In a first option, all PCI values for the region may be shared among stationary and mobile IAB-nodes within the region. In this option, the mobile TAB node 702 may run into PCI confliction issue with a stationary TAB node or another mobile IAB-node. The mobile IAB node 702 may select a new PCI for the IAB node 702, and the new PCI may be selected from a set of PCIS allocated for both stationary IAB nodes and mobile IAB nodes within the particular region.

In another option, the PCI values for the region may be divided into separate subsets, one subset dedicated for mobile IAB-nodes within the region, and one subset dedicated for stationary IAB-nodes within the region. In this option, the mobile TAB node 702 may only run into a PCI confliction with another mobile IAB-node. The mobile IAB node 702 may select a new PCI for the IAB node 702, and the new PCI may be selected from a set of PCIS allocated for mobile TAB nodes within the particular region.

In some aspects, for a mobile TAB node 702, the set of allowed PCI values may be updated with a location of the mobile IAB node 702. The central entity 701 may send the configuration 705, including the set of allowed PCI values, to the IAB node 702. The mobile TAB node 702 may receive a configuration for the PCI change in response to moving to a new region. The mobile IAB node 702 may update the set of allowed PCI values in response to moving to a new region, as illustrated at 712.

For example, the set of allowed PCI values associated with a geographic region for the mobile IAB node 702 may be broadcast by the stationary IAB-nodes 703 (e.g., the parent IAB node of the mobile IAB node 702) within the region. For example, the stationary IAB nodes 703 (e.g., the parent IAB node) may broadcast the updated set of allowed PCI values 708 to the IAB node 702 when the mobile TAB node 702 enters this region. Whenever the mobile TAB node 702 enters this region, the mobile TAB node 702 may receive the updated set of allowed PCI values 708 from its parent TAB node 703.

For another example, the different sets of allowed PCI values and a corresponding mapping to different geographic regions may be configured for the mobile IAB node 702 when the mobile IAB node 702 first joins the network. The mobile IAB node 702 may be configured with the different sets of allowed PCI values when joining the network. The parent stationary IAB node 703 may broadcast a region ID 707 for PCI management. When the mobile IAB node 702 moves to the new region, the mobile IAB node 702 may obtain the region ID 707 broadcast from its parent stationary node 703, and then identify the corresponding set of allowed PCI values 708 based on the latest region ID 707, as illustrated at 712.

In one configuration, the PCI change may be enabled for mobile IAB nodes, e.g., and not for stationary IAB nodes. In this case, the set of allowed PCI value may be configured for mobile IAB nodes. In another configuration, the PCI change may be enabled for both stationary and mobile IAB nodes. In this case, depending on whether PCI space is separated for stationary and mobile IAB nodes, the set of allowed PCI values configured for the mobile IAB node 702 at a region may be the same or different from a stationary IAB node at the same region.

In some aspects, the IAB node 702 may change the PCI when one or more triggering conditions are met, as illustrated at 716. The PCI change may be triggered for the IAB node 702 when one or more of the following triggering conditions are satisfied.

A triggering condition may include movement of the IAB node 702 to a new region. For example, when the set of allowed PCI values is updated by the network, e.g., based on the location of the mobile IAB node 702, and the current PCI value in use does not belong to the updated set of allowed PCI values 708, the IAB node 702 may change the PCI of the IAB node 702 to one of the allowed PCI values for the new region.

A triggering condition may include expiration of a time period based on a configured periodicity. In some aspects, the IAB node 702 may change the PCI periodically, where the periodicity can be configured by the network.

A triggering condition may include detecting a potential PCI collision issue with another IAB-node, as illustrated at 714. The IAB node 702 may change the PCI of the IAB node when the IAB node 702 detects the potential PCI collision issue with another IAB node 704. The IAB node 702 may change the PCI of the IAB node based on the detected PCI collision with the IAB node 704. For example, the IAB node 702 may use its MT function to scan and detect PCIs of other IAB-nodes (e.g., 704) in the network, and may decide to update the PCI of the IAB node 702 if another IAB node (e.g., 704) with the same PCI value is detected. If the IAB node 702 detects the another IAB node 704 with the same PCI value, the IAB node 702 may change the PCI value of the IAB node 702.

For another example, the IAB node 702 may receive a neighbor list message from its parent IAB node 703 via MT function, and may decide to update the PCI of the IAB node 702, if another IAB node 704 with the same PCI value is included in the neighbor list.

For yet another example, the IAB node 702 may detect PCI collision through the performance of child access UEs of the IAB node 702. The child access UEs may keep to have a very high DL Block Error Rate (BLER) though the reported CSI indicates a good channel quality, which may be a strong indication of the PCI collision. The IAB node 702 may decide to update the PCI value of IAB node 702.

A triggering condition may include receiving an indication that the PCI of the IAB node should be changed. When receiving the indication from another entity (e.g., from an IAB donor CU, or a parent-node, or a child node etc.), the IAB node 702 may change the PCI value of the IAB node 702. For example, another IAB node (e.g., 704) may detect the potential PCI collision issue with the IAB node 702, and send the indication to the IAB node 702 directly or indirectly via CU.

Any of the above triggering conditions may be configured by the network, or may be defined.

When the IAB node 702 detects potential PCI collision with another IAB node 704, in one option, the IAB node 702 may perform a PCI change without coordination with another IAB node. For this option, if both the IAB node 702 and the IAB node 704 detect a PCI collision, the IAB node 702 and the IAB node 704 independently perform the PCI change.

In another option, the IAB node 702 may coordinate with the another IAB node 704 to determine which node should change the PCI based on one or more the following factors. The IAB node 702 may send/receive a coordination message 715 to/from the IAB node 704 in order to determine which node should change the PCI. The IAB node 702 may communicate with the IAB node 704 upon detecting the PCI collision with the IAB node 704 to determine whether a change in the PCI of the IAB node 702 is needed or a change in the PCI of the IAB node 704 is needed; and the IAB node 702 may determine to change the PCI of the IAB node 702 based on the communication, e.g., the coordination message 715.

The IAB node may consider factors when determining whether to change the PCI may include a load parameter, e.g., number of served UEs/IAB-nodes, buffer status of these UEs/IAB-nodes. Another of the factors to consider may include a history parameter. For example, frequently changing the PCI of a cell should be avoided, e.g., a timer may be defined for this purpose. Yet another of the factors may include type of service the node offers. For example, if the node provides only Non-Standalone (NSA) service, then changing the PCI of the node is easier because the node may not participate in an initial access procedure.

Still another of the factors to consider when determining whether to change the PCI may include the type of IAB-node, e.g., a mobile IAB node versus a stationary IAB-node. The mobile IAB node may have a higher priority to change the PCI than a stationary IAB node when these two nodes have potential PCI collision issue. Additionally, a mobile IAB node mounted on a bus that primarily provides service to the passengers (and not the pedestrians) might be treated differently than a mobile IAB node that serves any arbitrary UE.

As illustrated in FIG. 7, if the IAB node 702 is enabled to make the PCI change, once the PCI change is triggered, the IAB node 702 may determine a new PCI value within the set of allowed values, as illustrated at 716. The new PCI value may be selected from the set of allowed values either randomly or based on a random seed if the random seed parameter is configured.

After changing the PCI of the IAB node 702, the IAB node 702 may send a notification to an IAB-donor CU with the updated PCI value via F1-AP interface. The IAB node 702 may send information to the IAB donor CU indicating the changed PCI of the IAB node 702.

After changing the PCI of the IAB node 702, the IAB node 702 may send a notification to its parent IAB node and/or its child IAB node with the updated PCI value. The IAB node 702 may send the information indicating the changed PCI of the IAB node 702 further to at least one of a parent IAB node or a child IAB node.

Figure 8:
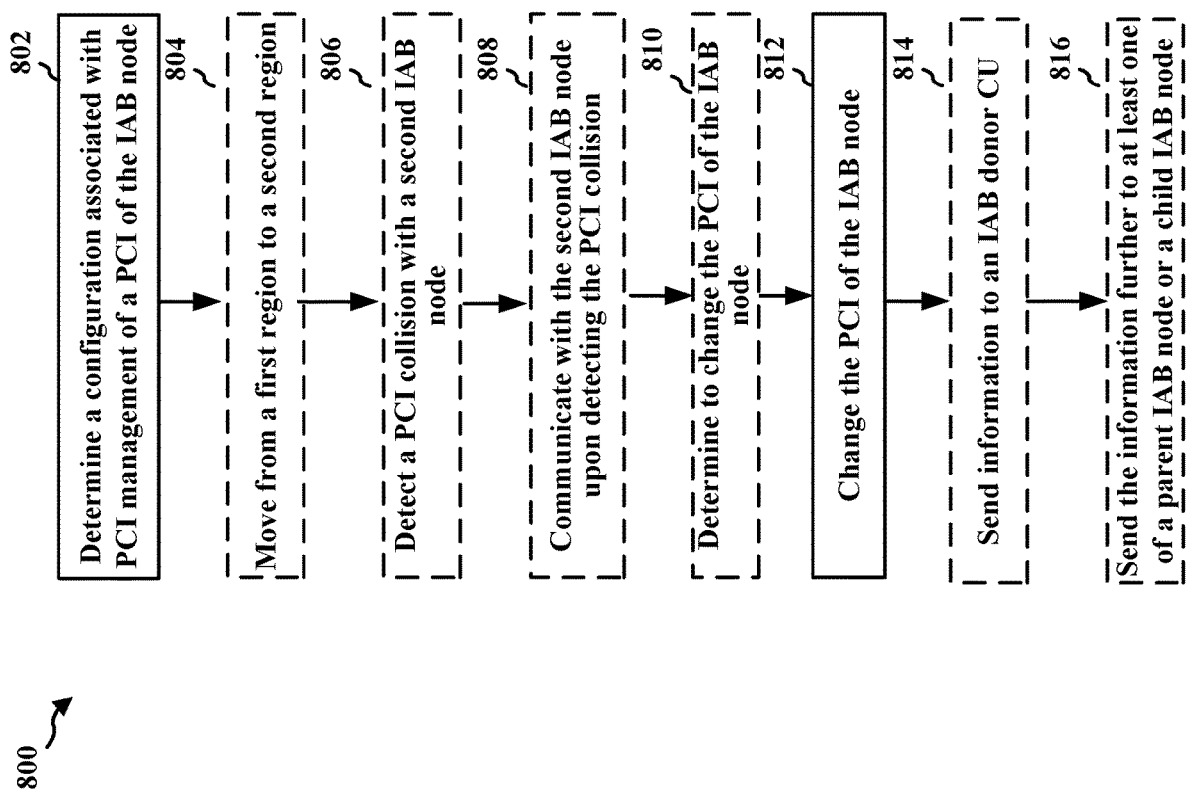
FIG. 8 is a flowchart of a method of wireless communication.

FIG. 8 is a flowchart 800 of a method of wireless communication. The method may be performed by an IAB node (e.g., the IAB node 103, 420, 520*a*, 690; the apparatus 902 or 1002, which may include the memory 376 and which may be the entire apparatus or a component of the apparatus such as the TX processor 316, the RX processor 370, and/or the controller/processor 375) in a mobile IAB-network. To facilitate an understanding of the techniques and concepts described herein, the method of flowchart 800 may be discussed with reference to the examples illustrated in FIG. 7. Optional aspects may be illustrated in dashed lines. Aspects presented herein provide for distributed PCI management for the mobile IAB-network. A PCI of the IAB node may be autonomously updated by the IAB node itself, which may be controlled by a network entity via one or more of the configuration parameters. In this way, PCI collision issue may be addressed, and the reliability of communication may be improved.

Figure 9:
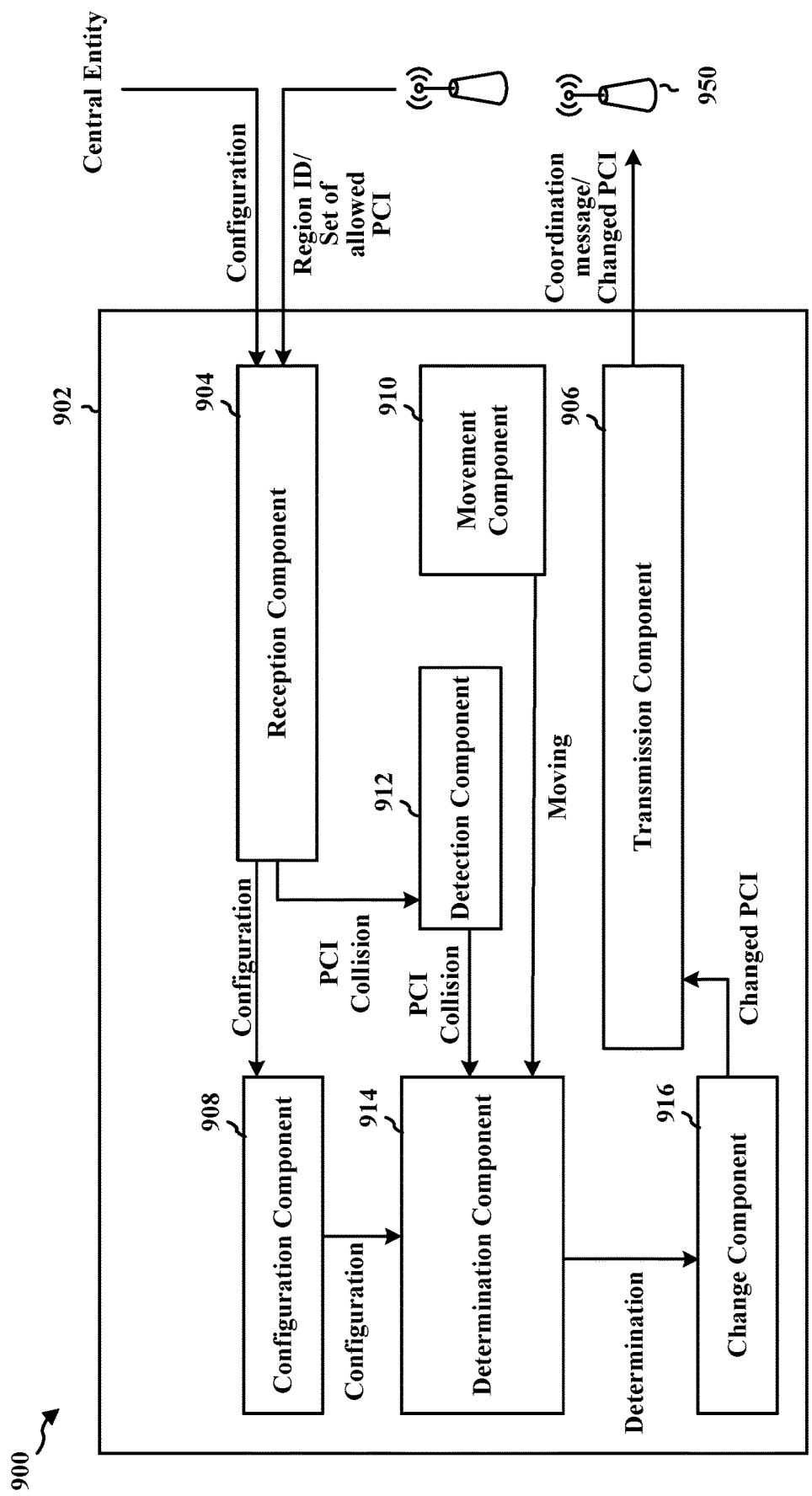
FIG. 9 is a conceptual data flow diagram illustrating the data flow between different means/components in an example apparatus.
Figure 10:
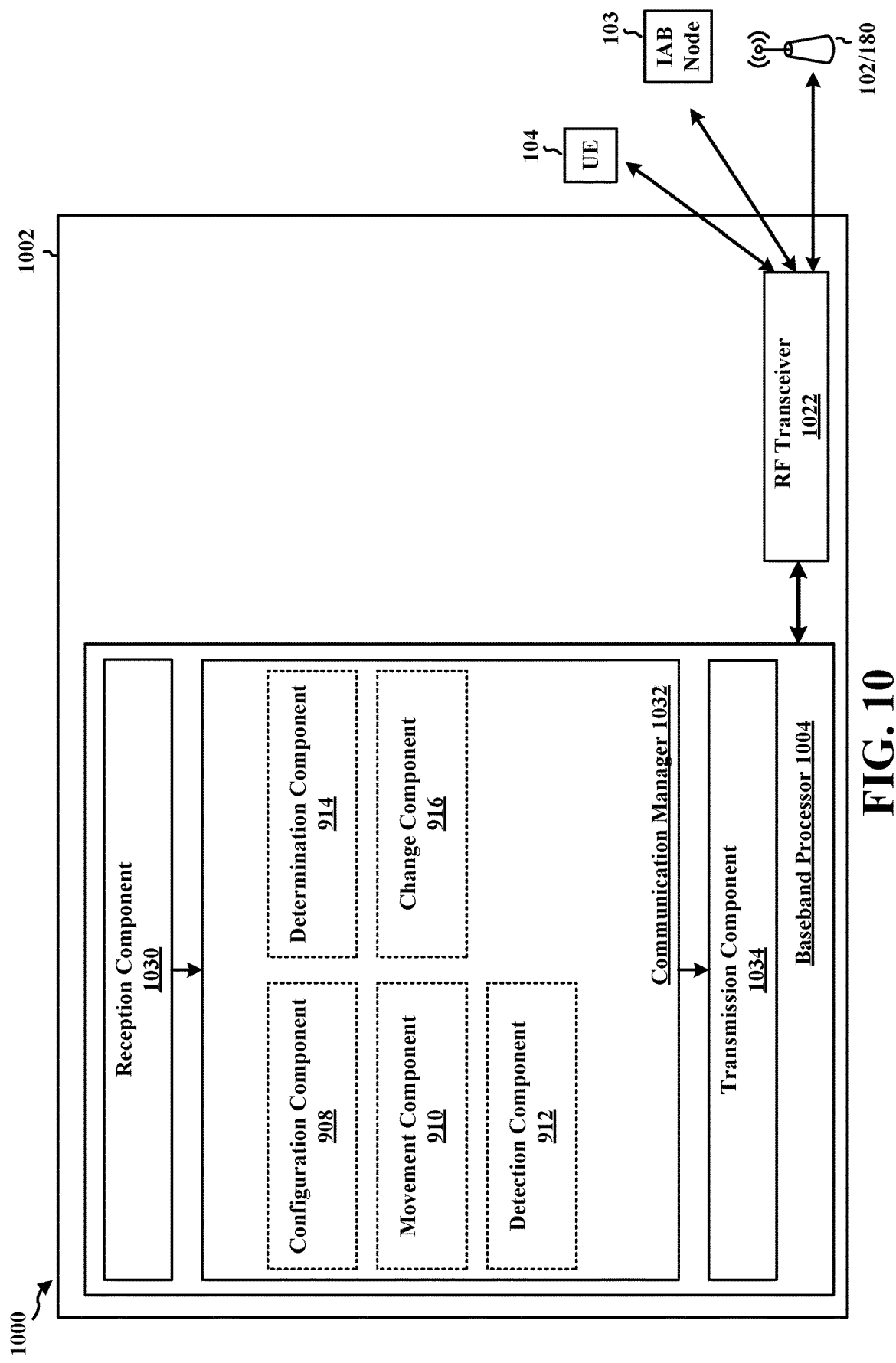
FIG. 10 is a diagram illustrating an example of a hardware implementation for an apparatus employing a processing system.

At 802, the IAB node may determine a configuration associated with PCI management of the PCI of the IAB node. For example, 802 may be performed by a configuration component 908 as illustrated in FIG. 9 or 10. For example, the configuration may be received from the network entity, where the network entity may be one of an MME, an IAB donor, a stationary IAB node, a base station, or a related network entity. For example, referring back to FIG. 7, a central entity 701 may send a configuration 705, e.g., via a configuration message, to an IAB node 702. The central entity 701 may send the configuration message to each of IAB-nodes in the mobile IAB network. A PCI of the IAB node 702 may be autonomously updated by the IAB node 702 itself. The autonomous update may be controlled by the central entity 701 via one or more of the configuration parameters. The decision whether to change the PCI of the IAB node 702 may be made by the IAB node 702 itself and the central entity 701 may control autonomous update behavior of the IAB node 702 by the one or more of the configuration parameters. In some aspects, the IAB node may be a mobile IAB node or a stationary IAB node.

In some aspects, the configuration 705 may include a set of configuration parameters. One of the configuration parameters, which is controlled by the central entity 701, may be a flag to enable/disable a PCI change. In one aspect, the network may only allow the PCI change for a subset of IAB-nodes, e.g., only mobile IAB-nodes in the network are allowed to autonomously update the PCI when a PCI collision occurs. For example, during configuration of different IAB nodes, a mobile IAB node may have a flag to enable the PCI change, and a stationary IAB node may have a flag to disable the PCI change. The flag may be indicated for each individual IAB-node, or for different types of IAB-nodes. One example of different types of nodes may be stationary IAB-nodes versus mobile IAB-nodes. In such an example, the mobile IAB-node may have the flag to enable the PCI change, and the stationary IAB-node may have the flag to disable the PCI change.

In some aspects, the configuration may include a set of allowed PCIs, and the TAB node changes the PCI of the TAB node by setting the PCI of the TAB node to one PCI in the set of allowed PCIs. For example, referring back to FIG. 7, the configuration may include a set of allowed PCI values for the TAB node to use for the PCI change. The network (e.g., the central entity 701, a parent of the TAB node 703, a stationary node 703, etc.) may configure the set of allowed PCI values that the IAB node 702 may use for the PCI change of the IAB node 702. In case if the set of allowed PCI values is not configured, for example, the whole PCI space may be used for the PCI change if the PCI change is enabled for the TAB node 702. The IAB node 702 may change the PCI of the IAB node 702 by setting the PCI of the IAB node 702 to one PCI in the set of allowed PCIs, as illustrated at 716.

In some aspects, the configuration may include a random seed parameter, which may be used for the IAB node 702 to select a PCI within the set of allowed PCI values. If the random seed parameter is not configured, the PCI value may be determined randomly by the IAB node 702 when the PCI change is enabled for this TAB node 702. The IAB node 702 may select the one PCI in the set of allowed PCIs based on the random seed, as illustrated at 716.

In some aspects, the configuration may include triggering conditions for changing the PCI, and the IAB node changes the PCI upon at least one of the triggering conditions being satisfied, where the triggering conditions may comprise at least one of movement of the TAB node from a first region to a second region, expiration of a time period based on a configured periodicity, a detected PCI collision with another TAB node, or an indication that the PCI of the IAB node should be changed. For example, referring back to FIG. 7, the IAB node may change the PCI upon at least one of the triggering conditions being satisfied, as illustrated at 716.

The PCI change may be triggered for the IAB node 702 when one or more of the following triggering conditions are satisfied.

In one configuration, one of the triggering conditions may include at least one of movement of the IAB node 702 to a new region. For example, when the set of allowed PCI values is updated by the network, e.g. based on the location of the mobile TAB node 702, and the current PCI value in use does not belong to the updated set of allowed PCI values 708, the IAB node 702 may change the PCI of the IAB node 702. In another configuration, one of the triggering conditions may include expiration of a time period based on a configured periodicity. In some aspects, the IAB node 702 may change the PCI periodically, where the periodicity can be configured by the network.

In yet another configuration, one of the triggering conditions may include detecting a potential PCI collision issue with another IAB-node, as illustrated at 714. In still another configuration, one of the triggering conditions may include receiving an indication that the PCI of the TAB node should be changed.

At 804, the TAB node may move from a first region to a second region, where the configuration may be received in response to moving to the second region. For example, 804 may be performed by a movement component 910 as illustrated in FIG. 9 or 10. For example, referring back to FIG. 7, for a mobile IAB node 702, the set of allowed PCI values may be updated with a location of the mobile IAB node 702. The mobile IAB node 702 may receive a configuration for the PCI change in response to moving to a new region. The mobile IAB node 702 may update the set of allowed PCI values in response to moving to a new region, as illustrated at 712. For example, the set of allowed PCI values associated with a geographic region for the mobile TAB node 702 may be broadcast by the stationary IAB-nodes 703 (e.g., the parent TAB node of the mobile IAB node 702) within the region. For example, the stationary IAB-nodes 703 (e.g., the parent IAB-node) may broadcast the updated set of allowed PCI values 708 to the TAB node 702 when the mobile IAB node 702 enters this region. Whenever the mobile IAB node 702 enters this region, the mobile IAB node 702 may receive the updated set of allowed PCI values 708 from its parent IAB node 703. For another example, all the different sets of allowed PCI values and a corresponding mapping to different geographic regions may be configured for the mobile IAB node 702 when the mobile TAB node 702 first joins the network. The mobile IAB node 702 may be configured with the different sets of allowed PCI values when joining the network. The parent stationary node 703 may broadcast a region ID 707 for PCI management. When the mobile TAB node 702 moves to the new region, the mobile TAB node 702 may obtain the region ID 707 broadcast from its parent stationary node 703, and then identify the corresponding set of allowed PCI values 708 based on the latest region ID 707, as illustrated at 712.

In some aspects, the changing the PCI of the IAB node may comprise selecting a new PCI for the IAB node, and the new PCI is selected from a set of PCIs allocated for both stationary IAB nodes and mobile IAB nodes within a particular region.

In some aspects, the changing the PCI of the IAB node comprises selecting a new PCI for the IAB node, and the new PCI is selected from a set of PCIs allocated for mobile IAB nodes within a particular region.

At 806, the IAB node may detect a PCI collision with a second IAB node, where the IAB node may change the PCI of the IAB node further based on the detected PCI collision with the second IAB node. For example, 806 may be performed by a detection component 912 as illustrated in FIG. 9 or 10. For example, referring back to FIG. 7, the IAB node 702 may change the PCI of the IAB node when the IAB node 702 detects the potential PCI collision issue with another IAB node 704. The IAB node 702 may change the PCI of the IAB node based on the detected PCI collision with the IAB node 704. For example, the IAB node 702 may use its MT function to scan and detect PCIs of other IAB-nodes (e.g., 704) in the network, and may decide to update the PCI of the IAB node 702 if another IAB node (e.g., 704) with the same PCI value is detected. If the IAB node 702 detects the another IAB node 704 with the same PCI value, the IAB node 702 may change the PCI value of the IAB node 702. For another example, the IAB node 702 may receive a neighbor list message from its parent IAB node 703 via MT function, and may decide to update the PCI of the IAB node 702, if another IAB node 704 with the same PCI value is included in the neighbor list. For yet another example, the IAB node 702 may detect PCI collision through the performance of child access UEs of the IAB node 702. The child access UEs may keep to have a very high DL Block Error Rate (BLER) though the reported CSI indicates a good channel quality, which may be a strong indication of the PCI collision. The IAB node 702 may decide to update the PCI value of IAB node 702.

At 808, the IAB node may communicate with the second IAB node upon detecting the PCI collision with the second IAB node to determine whether a change in the PCI of the IAB node is needed or a change in the PCI of the second IAB node is needed. For example, 808 may be performed by a transmission component 906 as illustrated in FIG. 9 or 10. For example, referring back to FIG. 7, the IAB node 702 may coordinate with the another IAB node 704 to determine which node should change the PCI based on one or more the following factors. The IAB node 702 may send/receive a coordination message 715 to/from the IAB node 704 in order to determine which node should change the PCI. The IAB node 702 may communicate with the IAB node 704 upon detecting the PCI collision with the IAB node 704 to determine whether a change in the PCI of the IAB node 702 is needed or a change in the PCI of the IAB node 704 is needed; and the IAB node 702 may determine to change the PCI of the IAB node 702 based on the communication, e.g., the coordination message 715.

At 810, the IAB node may determine to change the PCI of the IAB node, e.g., based on the communication. For example, 810 may be performed by a determination component 914 as illustrated in FIG. 9. For example, referring back to FIG. 7, the IAB node 702 may coordinate with the another IAB node 704 to determine which node should change the PCI based on one or more the following factors. The IAB node 702 may send/receive a coordination message 715 to/from the IAB node 704 in order to determine which node should change the PCI. The IAB node 702 may communicate with the IAB node 704 upon detecting the PCI collision with the IAB node 704 to determine whether a change in the PCI of the IAB node 702 is needed or a change in the PCI of the IAB node 704 is needed; and the IAB node 702 may determine to change the PCI of the IAB node 702 based on the communication, e.g., the coordination message 715.

At 812, the IAB node may changing the PCI of the IAB node, e.g., based on the determined configuration. For example, 812 may be performed by a change component 916 as illustrated in FIG. 9 or 10. For example, referring back to FIG. 7, if the IAB node 702 is enabled for the PCI change, once the PCI change is triggered, the IAB node 702 may determine a new PCI value within the set of allowed values either randomly or based on a random seed if configured, as illustrated at 716.

In some aspects, the IAB node may change the PCI of the IAB node by setting the PCI of the IAB node to one PCI in the set of allowed PCIs. For example, referring back to FIG. 7, the configuration may include a set of allowed PCI values for the IAB node to use for the PCI change. The network (e.g., the central entity 701, a parent of the IAB node 703, a stationary node 703, etc.) may configure the set of allowed PCI values that the IAB node 702 may use for the PCI change of the IAB node 702. In case if the set of allowed PCI values is not configured, for example, the whole PCI space may be used for the PCI change if the PCI change is enabled for the IAB node 702. The IAB node 702 may change the PCI of the IAB node 702 by setting the PCI of the IAB node 702 to one PCI in the set of allowed PCIs, as illustrated at 716.

In some aspects, the IAB node may select the one PCI in the set of allowed PCIs based on the random seed. For example, referring back to FIG. 7, the configuration may include a random seed, which may be used for the IAB node 702 to select a PCI within the set of allowed PCI values. If not configured, the PCI value may be determined randomly by the IAB node 702 if the PCI change is enabled for this IAB node 702. The IAB node 702 may select the one PCI in the set of allowed PCIs based on the random seed, as illustrated at 716.

At 814, the IAB node may send information to an IAB donor CU indicating the changed PCI of the IAB node. For example, 814 may be performed by the transmission component 906 as illustrated in FIG. 9 or 10. For example, referring back to FIG. 7, after changing the PCI of the IAB node 702, the IAB node 702 may send a notification to an IAB-donor CU with the updated PCI value via F1-AP interface. The IAB node 702 may send information to the IAB donor CU indicating the changed PCI of the IAB node 702.

At 816, the IAB node may send the information indicating the changed PCI of the IAB node further to at least one of a parent IAB node or a child IAB node. For example, 814 may be performed by the transmission component 906 as illustrated in FIG. 9 or 10. For example, referring back to FIG. 7, after changing the PCI of the IAB node 702, the IAB node 702 may send a notification to its parent IAB node and/or its child IAB node with the updated PCI value. The IAB node 702 may send the information indicating the changed PCI of the IAB node 702 further to at least one of a parent IAB node or a child IAB node.

FIG. 9 is a conceptual data flow diagram 900 illustrating the data flow between different means/components in an example apparatus 902. The apparatus may be an IAB node (e.g., the IAB node 103, 420, 520*a*, 690; the apparatus 902 or 1002, which may include the memory 376 and which may be the entire apparatus or a component of the apparatus such as the TX processor 316, the RX processor 370, and/or the controller/processor 375) in a mobile IAB-network. The apparatus includes a reception component 904 that is configured to receive a configuration for PCI management, e.g., as described in connection with 802 in FIG. 8. The apparatus includes a transmission component 906 that is configured to transmit a coordination message/updated PCI/information to another IAB-node 950/an IAB donor CU/at least one of a parent IAB node or a child IAB node, e.g., as described in connection with 808, 814 and 816 in FIG. 8. The apparatus includes a configuration component 908 that is configured to determine a configuration associated with PCI management of a PCI of the IAB node, e.g., as described in connection with 802 in FIG. 8. The apparatus may include a movement component 910 that is configured to move from a first region to a second region, e.g., as described in connection with 804 in FIG. 8. The apparatus may include a determination component 914 that is configured to determine to change the PCI of the IAB node based on the communication, e.g., as described in connection with 810 in FIG. 8. The apparatus includes a change component 916 that is configured to changing the PCI of the IAB node based on the determined configuration, e.g., as described in connection with 812 in FIG. 8.

The apparatus may include additional components that perform each of the blocks of the algorithm in the aforementioned flowcharts of FIGS. 7-8. As such, each block in the aforementioned flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 10 is a diagram 1000 illustrating an example of a hardware implementation for an apparatus 1002. The apparatus 1002 is an IAB node and includes a baseband unit 1004 and transceiver 1022. The apparatus may be an IAB node (e.g., the IAB node 103, 420, 520*a*, 690). The baseband unit 1004 may communicate through a cellular RF transceiver with the UE 104 or may communicate through the RF transceiver 1022 with other IAB nodes or with a base station 102 or 180. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The apparatus 1002 further includes at least one of the components 908, 910, 912, 914, 916, e.g., as described in connection with FIGS. 8 and 9. The components may be software components running in the processor, resident/stored in the computer readable medium/memory, one or more hardware components coupled to a processor, or some combination thereof. The apparatus 1002 may be a component of the IAB node 310 and may include the memory 376 and/or at least one of the TX processor 316, the RX processor 370, and the controller/processor 375. Alternatively, the apparatus 1002 may be the entire IAB node e.g., see 310 of FIG. 3).

In one configuration, the apparatus 902 or 1002 for wireless communication include s means for determining a configuration associated with physical cell identifier (PCI) management of a PCI of the IAB node. The apparatus 902 or 1002 further includes means for changing the PCI of the IAB node based on the determined configuration. The apparatus 902 or 1002 may further include means for moving from a first region to a second region, where the configuration is received in response to moving to the second region. The apparatus 902 or 1002 may further include means for detecting a PCI collision with a second IAB node, where the IAB node changes the PCI of the IAB node further based on the detected PCI collision with the second IAB node. The apparatus 902 or 1002 may further include means for communicating with the second IAB node upon detecting the PCI collision with the second IAB node to determine whether a change in the PCI of the IAB node is needed or a change in the PCI of the second IAB node is needed. The apparatus 902 or 1002 may further include means for determining to change the PCI of the IAB node based on the communication. The apparatus 902 or 1002 may further include means for sending information to an IAB donor central unit (CU) indicating the changed PCI of the IAB node. The apparatus 902 or 1002 may further include means for sending the information indicating the changed PCI of the IAB node further to at least one of a parent IAB node or a child IAB node. The aforementioned means may be one or more of the aforementioned components of the apparatus 902 and/or 1002 configured to perform the functions recited by the aforementioned means. As described supra, the means may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other examples or teachings described herein, without limitation.

Example 1 is a method of wireless communication of an IAB node, comprising: determining a configuration associated with PCI management of a PCI of the IAB node; and changing the PCI of the IAB node based on the configuration.

In Example 2, the method of Example 1 further includes that the configuration is received from a network entity, the network entity being one of an MME an IAB donor, a stationary IAB node, a base station, or a related network entity.

In Example 3, the method of Example 1 or Example 2 further includes that the IAB node is a mobile IAB node or a stationary IAB node.

In Example 4, the method of any of Examples 1-3 further includes that the configuration includes a flag indicating whether a change of the PCI is enabled or disabled for the IAB node.

In Example 5, the method of any of Examples 1-4 further includes that the configuration includes a set of allowed PCIS, and the IAB node changes the PCI of the IAB node by setting the PCI of the IAB node to one PCI in the set of allowed PCIS.

In Example 6, the method of any of Examples 1-5 further includes that the configuration includes a random seed, and the IAB node selects the one PCI in the set of allowed PCIS based on the random seed.

In Example 7, the method of any of Examples 1-6 further includes that the configuration includes triggering conditions for changing the PCI, and the IAB node changes the PCI upon at least one of the triggering conditions being satisfied.

In Example 8, the method of any of Examples 1-7 further includes that the triggering conditions comprise at least one of movement of the IAB node from a first region to a second region, expiration of a time period based on a configured periodicity, a detected PCI collision with another IAB node, or an indication that the PCI of the IAB node should be changed.

In Example 9, the method of any of Examples 1-8 further includes that the changing the PCI of the IAB node comprises selecting a new PCI for the IAB node, and the new PCI is selected from a set of PCIS allocated for both stationary IAB nodes and mobile IAB nodes within a particular region.

In Example 10, the method of any of Examples 1-9 further includes that the changing the PCI of the IAB node comprises selecting a new PCI for the IAB node, and the new PCI is selected from a set of PCIs allocated for mobile IAB nodes within a particular region.

In Example 11, the method of any of Examples 1-10 further includes moving from a first region to a second region, wherein the configuration is received in response to moving to the second region.

In Example 12, the method of any of Examples 1-11 further includes detecting a PCI collision with a second IAB node, wherein the IAB node changes the PCI of the IAB node further based on the PCI collision with the second IAB node.

In Example 13, the method of any of Examples 1-12 further includes communicating with the second IAB node upon detecting the PCI collision with the second IAB node to determine whether a change in the PCI of the IAB node is needed or a change in the PCI of the second IAB node is needed; and determining to change the PCI of the IAB node based on the communication.

In Example 14, the method of any of Examples 1-13 further includes sending information to an IAB donor central unit (CU) indicating a changed PCI of the IAB node.

In Example 15, the method of any of Examples 1-14 further includes sending the information indicating the changed PCI of the IAB node further to at least one of a parent IAB node or a child IAB node.

Example 16 is a device including one or more processors and one or more memories in electronic communication with the one or more processors storing instructions executable by the one or more processors to cause the device to implement a method as in any of Examples 1-15.

Example 17 is a system or apparatus including means for implementing a method or realizing an apparatus as in any of Examples 1-15.

Example 18 is a non-transitory computer readable medium storing instructions executable by one or more processors to cause the one or more processors to implement a method as in any of Examples 1-15.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of an integrated access and backhaul (IAB) node, comprising:
   receiving at the IAB node, prior to an event to trigger a physical cell identifier (PCI) change of the IAB node, a PCI change configuration comprising one or more configuration parameters for the IAB node to use for a PCI change of the IAB node in response to an occurrence of the event to trigger the PCI change; and
   changing a PCI of the IAB node based on the PCI change configuration and in response to the occurrence of the event to trigger the PCI change, the event occurring after receiving the PCI change configuration and including at least one of movement of the IAB node from a first region to a second region, expiration of a time period based on a configured periodicity, a detection of a PCI collision with another IAB node, or an indication that the PCI of the IAB node should be changed.

2. The method of claim 1, wherein the PCI change configuration is received from a network entity, the network entity being one of a mobility management entity (MME), an IAB donor, a stationary IAB node, a base station, or a related network entity.

3. The method of claim 1, wherein the IAB node is a mobile IAB node or a stationary IAB node.

4. The method of claim 1, wherein the PCI change configuration includes a flag indicating whether a change of the PCI is enabled or disabled for the IAB node.

5. The method of claim 1, wherein the PCI change configuration includes a set of allowed PCIs, and the IAB node changes the PCI of the IAB node by setting the PCI of the IAB node to one PCI in the set of allowed PCIs.

6. The method of claim 5, wherein the PCI change configuration includes a random seed, and the IAB node selects the one PCI in the set of allowed PCIs based on the random seed.

7. The method of claim 1, wherein the PCI change configuration includes one or more triggering conditions for changing the PCI, and the event to trigger the PCI change includes at least one of the one or more triggering conditions being satisfied.

8. The method of claim 1, wherein the changing the PCI of the IAB node comprises selecting a new PCI for the IAB node, and the new PCI is selected from a set of PCIs allocated for both stationary IAB nodes and mobile IAB nodes within a particular region.

9. The method of claim 1, wherein the changing the PCI of the IAB node comprises selecting a new PCI for the IAB node, and the new PCI is selected from a set of PCIs dedicated for mobile IAB nodes within a particular region.

10. The method of claim 1, wherein the event to trigger the PCI change includes the movement from the first region to the second region, the method further comprising moving from the first region to the second region, wherein the PCI is changed based on the PCI change configuration and in response to moving to the second region.

11. The method of claim 1, further comprising detecting the PCI collision with a second IAB node, wherein the event to trigger the PCI change is the detection of the PCI collision, and the IAB node changes the PCI of the IAB node in response to the detection of the PCI collision with the second IAB node.

12. The method of claim 11, further comprising:
transmitting or receiving communication with the second IAB node upon detecting the PCI collision with the second IAB node to determine whether a first change in the PCI of the IAB node is needed or a second change in the PCI of the second IAB node is needed; and
determining to change the PCI of the IAB node based on the communication.

13. The method of claim 11, further comprising:
communicating with the second IAB node, in response to the PCI collision, to coordinate the PCI change of the IAB node or of the second IAB node.

14. The method of claim 1, further comprising sending information to an IAB donor central unit (CU) indicating a changed PCI of the IAB node.

15. The method of claim 14, further comprising sending the information indicating the changed PCI of the IAB node further to at least one of a parent IAB node or a child IAB node.

16. An apparatus for wireless communication at an integrated access and backhaul (IAB) node, comprising:
means for receiving at the IAB node, prior to an event to trigger a physical cell identifier (PCI) change of the IAB node, a PCI change configuration comprising one or more configuration parameters for the IAB node to use for a PCI change of the IAB node in response to an occurrence of the event to trigger the PCI change; and
means for changing a PCI of the IAB node based on the PCI change configuration and in response to the occurrence of the event to trigger the PCI change, the event occurring after receiving the PCI change configuration and including at least one of movement of the IAB node from a first region to a second region, expiration of a time period based on a configured periodicity, a detection of a PCI collision with another IAB node, or an indication that the PCI of the IAB node should be changed.

17. An apparatus for wireless communication at an integrated access and backhaul (IAB) node, comprising:
a memory; and
at least one processor coupled to the memory and configured to:
receive at the IAB node, prior to an event to trigger a physical cell identifier (PCI) change of the IAB node, a PCI change configuration comprising one or more configuration parameters for the IAB node to use for a PCI change of the IAB node in response to an occurrence of the event to trigger the PCI change; and
change a PCI of the IAB node based on the PCI change configuration and in response to the occurrence of the event to trigger the PCI change, the event occurring after reception of the PCI change configuration and including at least one of movement of the IAB node from a first region to a second region, expiration of a time period based on a configured periodicity, a detection of a PCI collision with another IAB node, or an indication that the PCI of the IAB node should be changed.

18. The apparatus of claim 17, wherein the PCI change configuration is received from a network entity, the network entity being one of a mobility management entity (MME), an IAB donor, a stationary IAB node, a base station, or a related network entity.

19. The apparatus of claim 17, wherein the IAB node is a mobile IAB node or a stationary IAB node.

20. The apparatus of claim 17, wherein the PCI change configuration includes a flag indicating whether a change of the PCI is enabled or disabled for the IAB node.

21. The apparatus of claim 17, wherein the PCI change configuration includes a set of allowed PCIS, and the IAB node changes the PCI of the IAB node by setting the PCI of the IAB node to one PCI in the set of allowed PCIS.

22. The apparatus of claim 21, and wherein the PCI change configuration includes a random seed, and the IAB node selects the one PCI in the set of allowed PCIS based on the random seed.

23. The apparatus of claim 17, wherein the PCI change configuration includes one or more triggering conditions for changing the PCI, and the event to trigger the PCI change includes at least one of the one or more triggering conditions being satisfied.

24. The apparatus of claim 17, wherein to change the PCI of the IAB node, the at least one processor is configured to select a new PCI for the IAB node, and the new PCI is selected from a set of PCIs allocated for both stationary IAB nodes and mobile IAB nodes within a particular region.

25. The apparatus of claim 17, wherein to change the PCI of the IAB node, the at least one processor is configured to select a new PCI for the IAB node, and the new PCI is selected from a set of PCIs dedicated for mobile IAB nodes within a particular region.

26. The apparatus of claim 17, wherein the event to trigger the PCI change includes the movement to to the second region and the at least one processor is further configured to move from the first region to the second region and change the PCI based on the PCI change configuration and in response to moving to the second region.

27. The apparatus of claim 17, wherein the at least one processor is further configured to:

detect the PCI collision with a second IAB node, wherein the IAB node changes the PCI of the IAB node further based on the detection of the PCI collision with the second IAB node;

communicate with the second IAB node upon detecting the PCI collision with the second IAB node to determine whether a first change in the PCI of the IAB node is needed or a second change in the PCI of the second IAB node is needed; and determine to change the PCI of the IAB node based on the communication.

28. The apparatus of claim 17, wherein the at least one processor is further configured to send information to an IAB donor central unit (CU) indicating a changed PCI of the IAB node and to send the information indicating the changed PCI of the IAB node further to at least one of a parent IAB node or a child IAB node.

29. A non-transitory computer-readable medium storing computer executable code for an integrated access and backhaul (IAB) node, the code when executed by a processor cause the processor to:

receive at the IAB node, prior to an event to trigger a physical cell identifier (PCI) change of the IAB node, a PCI change configuration comprising one or more configuration parameters for the IAB node to use for a PCI change of the IAB node in response to an occurrence of the event to trigger the PCI change; and change a PCI of the IAB node based on the PCI change configuration and in response to the occurrence of the event to trigger the PCI change, the event occurring after reception of the PCI change configuration and including at least one of movement of the IAB node from a first region to a second region, expiration of a time period based on a configured periodicity, a detection of a PCI collision with another IAB node, or an indication that the PCI of the IAB node should be changed.

\* \* \* \* \*